United States Patent

Nojiri

[15] 3,651,381

[45] Mar. 21, 1972

[54] ELECTRONIC DEVICE USING BLOCK UNITS

[72] Inventor: Takasi Nojiri, 28-4 Aza Chogatsubo, Oaza-Inuyama, Inuyama-shi, Japan

[22] Filed: July 1, 1970

[21] Appl. No.: 51,493

[52] U.S. Cl. ....................................... 317/101 CC, 35/19 A

[51] Int. Cl. ....................................................... H05k 1/04

[58] Field of Search .................317/101 CC, 101 R; 35/19 A

[56] References Cited

UNITED STATES PATENTS

| | | | |
|---|---|---|---|
| 3,386,610 | 5/1968 | Nojiri | 317/101 CC |
| 3,514,872 | 6/1970 | Bradley | 317/101 CC |

*Primary Examiner*—David Smith, Jr.
*Attorney*—Linton & Linton

[57] ABSTRACT

An electronic device for constructing various electronic circuits by arranging block units substantially in two dimensions comprising block units, which are of a substantial rectangular plane view with an area equal to or integral multiple of a unit square, encasing a circuit element such as a resistor or an interconnection and being provided at its four corners with concave surfaces and on its side surfaces with resilient lead pieces which are bending slightly outwards to be deformable inwards and are connected electrically to the circuit element or the interconnection contained in the block unit, a basic board, a plurality of posts set up on said basic boards at vertexes of said unit squares supposed on said board, a plurality of resilient cap members attached to said posts and a case to receive said basic board, said block unit being individually held at said concave surfaces by said resilient cap members.

5 Claims, 5 Drawing Figures

INVENTOR

TAKASI NOJIRI

BY Linton and Linton

ATTORNEYS

TAKASI NOJIRI INVENTOR

BY Linton and Linton

ATTORNEYS

ELECTRONIC DEVICE USING BLOCK UNITS

The present invention relates to an electronic device easily assembled and reconstructed and more particularly to an improvement in an electronic device in which various circuit elements and interconnections formed in the standardized size are assembled and rearranged substantially in two dimensions and in a circuit diagram to realize many electronic circuits with flexibility, each circuit element and interconnection being rearrangeable, removable and interchangeable.

An electronic device of the type described above has been known in the prior art but in one of such conventional devices, in which lead wires are bridged in the form of a cobweb among circuit elements fixed at predetermined positions on a board, the visual correspondence of the real circuit element arrangement to the circuit diagram is rather poor and in addition there are the troublesome removal of lead wires once connected and the possibility of some misconnections when circuit elements must be interchanged or added. An electronic device has also been devised in which circuit elements as well as interconnections contained in block units can be arranged in a circuit diagram but the electrical contact between adjacent blocks may become incomplete as the result of the accumulated strains of the resilient portions of each block because in such a device the blocks are maintained at their positions by an integral balance of forces exerting among them. Accordingly there is a disadvantage that excellent technique and much cost are required for satisfactory electrical contact between blocks and the integral arrangement of blocks is apt to be disturbed by slight vibration while assembling.

An object of the present invention is to provide an electronic device in which block units containing circuit elements or interconnections can be assembled in a circuit diagram and each block element is held individually without disturbance to the holding of adjacent blocks.

Figure 1:
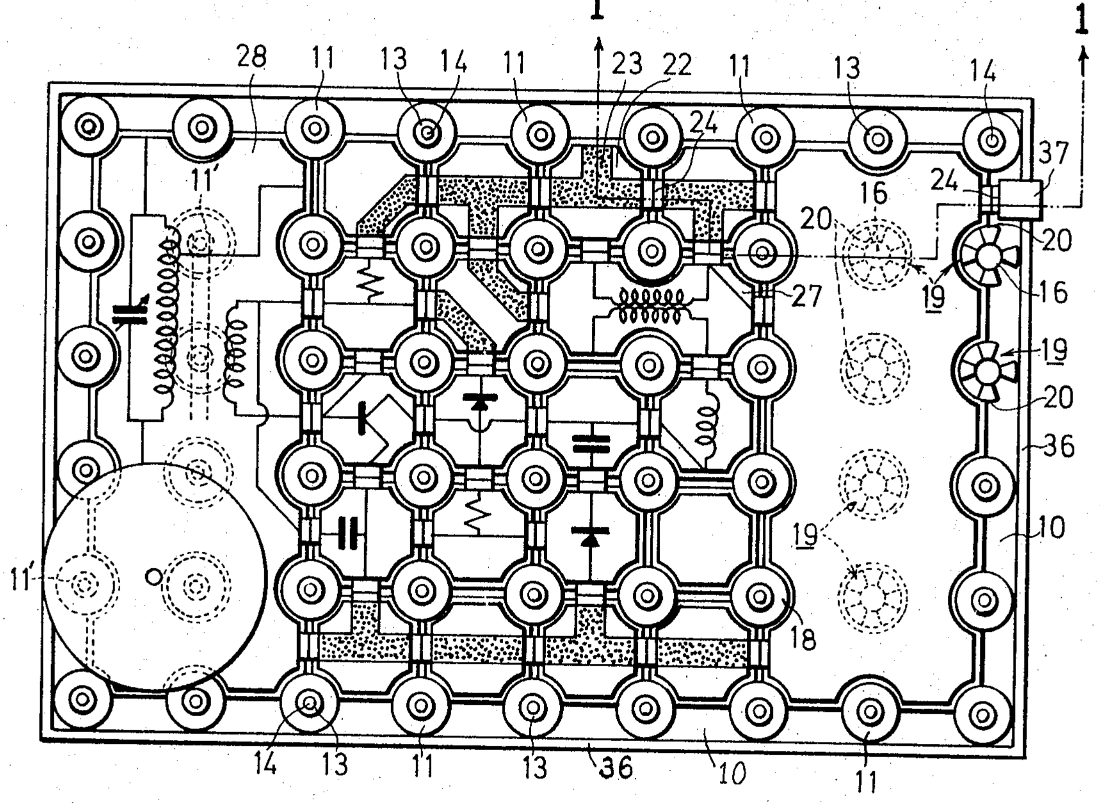
Figure 2:
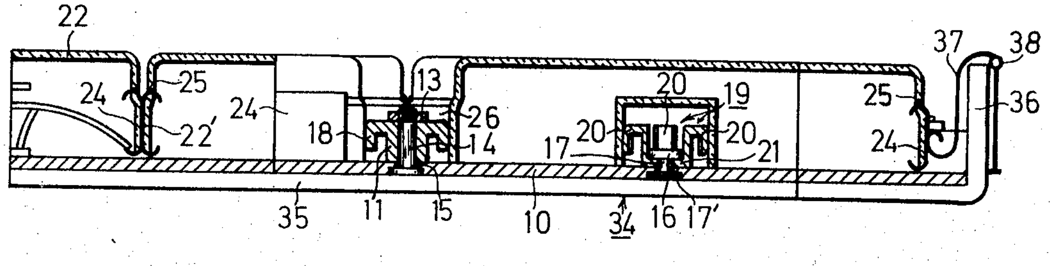
Figure 3:
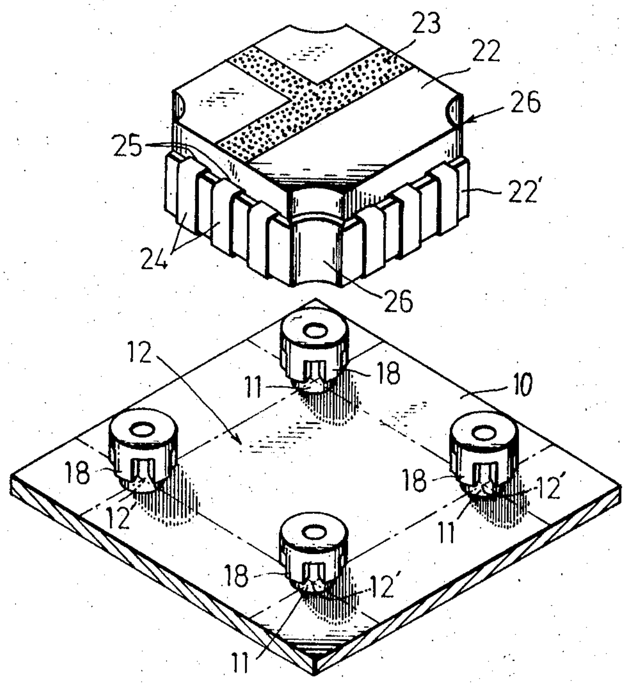
Figure 4:
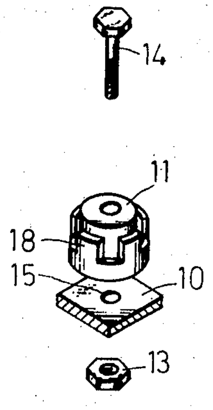
Figure 5:
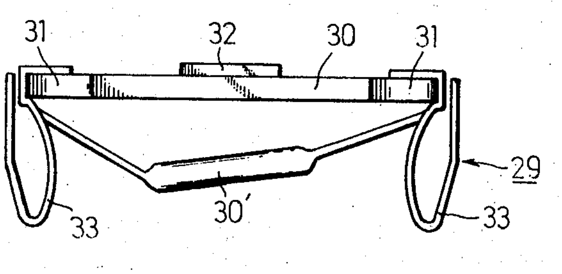

A more detail understanding of the above and other objects and the appreciation of advantages of the present invention will be obtained from the following description taken in conjunction with the accompanying drawings in which:

FIG. 1 is a plane view of an electronic device so assembled as to realize a one transistor refrex radio receiver as one of many electronic circuits with block units which can be provided arranged on a basic board, FIG. 2 is an enlarged sectional view taken along the line 1—1 in FIG. 1, FIG. 3 is an exploded perspective view partly in cross-section showing the relationship between the basic board and one of the block units, FIG. 4 is an exploded perspective view of another embodiment of a member to hold the block units and FIG. 5 is a front elevational view showing a different form of the block unit.

Referring now more in detail to the drawings, there is shown a planar basic board 10 made of electrically insulating material or metal with an insulating coating. A number of posts 11 made of insulating material in a hollow cylindrical form are set up at vertexes 12' of unit squares 12 imaginatively provided on the basic board 10. These posts are secured by means of a nut 13 and a bolt 14 inserted in a hole 15 bored through the basic board at said vertex or alternatively by means of a nut 16 and a bolt 17 with a flat head 17' as best shown in FIG. 2. The post 11 is provided integrally with a resilient cap member 18 which is deformable in the radial direction of the post 11. This resilient cap member can be replaced by a member 19 comprising four resilient pieces 20, which are made of turned down metallic strips, attached around an aperture member 21 with a through hole 21' for the passage of the bolt 17. The post 11 may be set up upside down as shown in FIG. 4. Next, a block unit represented by 22 made of insulating material substantially in an inverted box style, has a substantially square plane view and a basic area equal to said unit square 12. This block unit contains one of the circuit elements such as resistors, transistors and condensers or an interconnection, for example, of a T-shape or a H-shape and on the top of the block unit is printed an electrical symbol 23 indicating the electrical member contained in the block unit. On the sides 22' of the block unit 22 are attached lead pieces 24 to establish electrical contact with adjacent block units by insertion of said pieces into mounting holes 25. These lead pieces are slightly bent outwards but can deform inwards when pushed and, of course, are connected electrically with the circuit element contained in the block unit. The block unit 22 is provided at its corners with concave surfaces 26 with which the cap members 18 contact when the block unit 22 is inserted among the posts 11. Each block unit is then, secured on the basic board 10 individually by the contact pressure exerting between the surface 26 and the cap member 18 as the result of the deformation of the latter. If the height of the block unit 22 is made larger than that of the post 11, the concave surfaces 26 can serve as a knob member in mounting or removing the block unit. At the same time, the electrical contact between lead pieces attached to adjacent block units is ensured by the pressure due to the elastic deformation of said lead pieces. Another block unit represented by 27 or 28 has a base area which is an integral multiple of the area of the unit quare 12. In the case of the block unit 28, such posts as represented by 11' are covered by the block unit 28. A block unit 29 shown in FIG. 5 comprises a square plate 30 with concave surfaces 31 similar to those represented by 26 at its corners, a circuit element 30' held under the plate member 30, a knob 32 formed on the plate member and resilient lead pieces 33, which are made of turned up metallic strips, secured on the side of the plate member 30. The block unit 29, like the block unit 22, is held by cap members 18 at the concave surfaces 31. Parts of the block units 22 and 29 may be made transparent in order to visualize the circuit member contained therein. A case 34 to contain the basic board 10 comprises a base member 35 and a side frame 36, which serves also as a connector when more than one basic board must be used to construct a complicated circuit. For this purpose, the side frame 36 is provided with a lead spring member 37 for electrical connection with an adjacent basic board and hinges 38 for mechanical connection.

In constructing an electronic circuit, for example, a refrex radio receiver, block units are arranged substantially in two dimensions one after another as shown in FIG. 1 according to a wiring diagram. The assembling of the block units is carried out very easily by the simple insertion of each block unit among posts 11 and one can complete the electronic circuit watching the wiring diagram as if he drew another wiring diagram. To modify some part of the circuit thus constructed, some of the assembled block units can be replaced by those provided beforehand. When a lecturer assembles an electronic circuit before students, the block units may be mounted on the base board held vertically on a blackboard so that electrical symbols 23 may be seen by the students. When a major circuit including too many circuit elements is to be assembled, a minor rather simple circuit such as an amplifying circuit and the minor circuits so assembled are interconnected by means of lead spring members 37 and hinges 38.

As is clear from the foregoings, the present invention makes it possible to assemble or modify various electronic circuits of interest by arranging, rearranging or interchanging the block units on the basic board 10 provided with posts 11 having resilient cap members 18. The visual correspondence of the assembled circuit with its wiring diagram is improved to a large extent because the arrangement of the block units is substantially two dimensional. Further, as each block unit is held individually by posts 11, it can be adapted or removed independently of other adjacent ones and the assembled circuit is difficult to break up as a whole when it suffers local vibration or disturbance due to adaption or removal of the block unit.

Having set forth the nature of the invention what I claim is:

1. An electronic device for constructing various electronic circuits by arranging block units substantially in two dimensions, comprising block units each of which are of a substantial rectangular plane view with an area at least equal to an imaginary unit square, a plurality of circuit elements or interconnections each encased in one of said block units, each block unit being provided at its four corners with concave surfaces and on its side surfaces with resilient lead pieces which are extending slightly outwards to be deformable inwards and are connected electrically to the circuit element contained in its block unit, a basic board, a plurality of posts set up on said basic board at vertexes of said unit imaginary squares on said board, a plurality of resilient cap members attached to said posts and a case containing said basic board, said block units being individually held at said concave surfaces by said resilient cap members.

2. An electronic device according to claim 1 in which the top of each block unit has provided thereon an electric symbol indicating the circuit element or an interconnection contained in said block unit.

3. An electronic device according to claim 1 in which said cap member comprises an aperture member and a plurality of turned down resilient pieces attached to the periphery of said aperture member.

4. An electronic device according to claim 1 in which said block unit consists of a rectangular plate member having an area at least equal to said imaginary unit square and concave surfaces at its corners, a circuit element or an interconnection position under and connected to said plate member and resilient lead pieces formed of a turn up metallic strip attached to the sides of said plate member and a knob fixed on said plate member.

5. An electronic device according to claim 1 in which part of said block unit is made of transparent material to visualize said circuit element from the outside.

* * * * *